E. STEBBINGS.
GATE.
APPLICATION FILED JULY 27, 1909.
961,551.
Patented June 14, 1910.
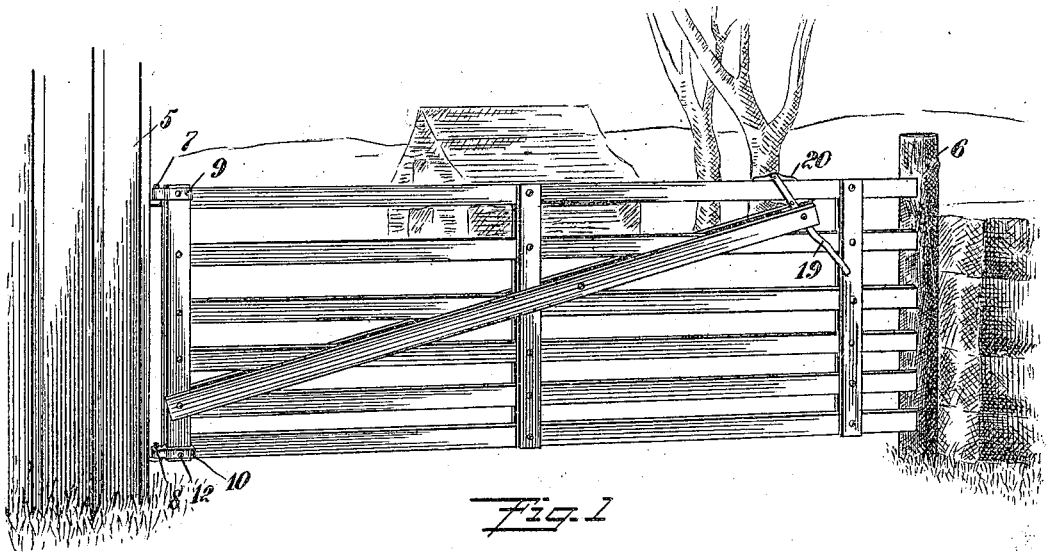
Fig. 1.
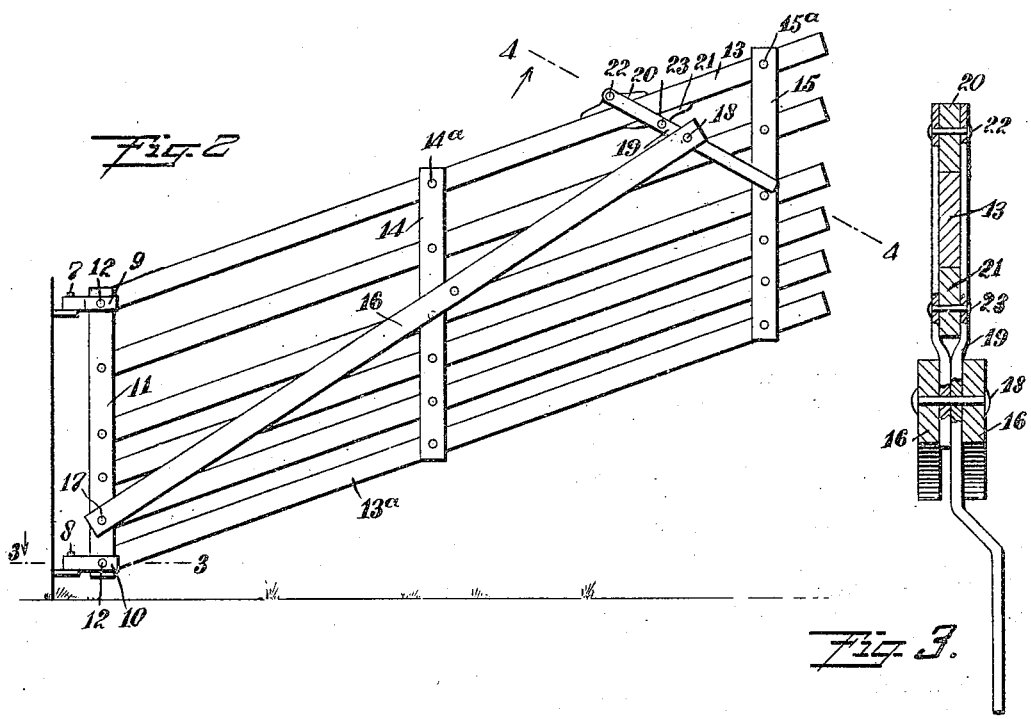
Fig. 2.
Fig. 3.
WITNESSES
E. G. Bromley,
Walton Harrison
INVENTOR
Eugene Stebbings
BY
Munn & Co
ATTORNEYS

UNITED STATES PATENT OFFICE.

EUGENE STEBBINGS, OF MACON, MISSOURI.

GATE.

961,551.   Specification of Letters Patent.   Patented June 14, 1910.

Application filed July 27, 1909. Serial No. 509,765.

*To all whom it may concern:*

Be it known that I, EUGENE STEBBINGS, a citizen of the United States, and a resident of Macon, in the county of Macon and State of Missouri, have invented a new and Improved Gate, of which the following is a full, clear, and exact description.

My invention relates to gates, such, for instance, as are used upon farms and in connection with ordinary roadways, my more particular purpose being to produce a type of gate having certain constructional advantages and adapted when raised by hand into different positions to maintain said position until afterward disturbed.

More particularly stated, my invention comprehends an improved construction whereby an operator may lift the outer or free end of the gate to any desired height within reasonable limits, and upon releasing the gate the latter will stand as thus placed, yet free to swing upon its hinges or pivots; and by merely moving a hand lever carried by the gate the latter may be lowered into its normal position so that it rests upon the ground.

Reference is to be had to the accompanying drawings forming a part of this specification, in which similar characters of reference indicate corresponding parts in all the figures.

Figure 1 is a perspective of my improved gate complete; Fig. 2 is an elevation showing the outer or free end of the gate as raised, and also showing the gate as automatically retaining this position; Fig. 3 is an enlarged section upon the line 4—4 of Fig. 2, looking in the direction of the arrow, and showing how the hand lever is connected with the gate.

At 5, 6 are the gate posts and mounted upon the post 5 are stationary hinge members 7, 8. Revolubly connected with the latter are hinge members 9, 10, the latter being secured to a cleat 11 by aid of bolts 12 or equivalent fastenings. A number of flat longitudinal bars 13 are pivoted to the cleat 11 and may be swung upwardly. These bars 13 are connected by aid of cleats 14, 15 secured thereto by aid of bolts 14ª, 15ª, so as to allow the outer or free end of the gate to be raised. At 16 is another bar which is connected by a bolt 17 with the cleat 11 and extends diagonally upward across the bars 13. The outer or free end of the bar 16 is provided with a bolt 18 and pivotally connected to the latter is a hand lever 19 which carries two clamping members 20, 21 secured to it by aid of bolts 22, 23. Except for the action of the hand lever 19 and the clamping members 20, 21, the outer or free end of the gate normally rests upon the ground, and when raised tends to drop back into its normal position—that is, the gate normally tends to rest upon the ground. When, however, the gate is raised as indicated in Fig. 1, the clamping members 20, 21 slide backwardly toward the left according to Fig. 2, and continue this movement until they grip against the top and bottom edges of the upper bar 13. As the outer or free end of the gate is raised higher and higher, the clamps 20, 21 move progressively to the left according to Fig. 1. When, however, the gate is released the outer or free end (right of Fig. 2) can not descend but remains in the air. This is because the descent of the end of the gate thus raised would mean the travel of the bars 16 toward the top of the cleat 15, and this is prevented by the gripping action of the members 20, 21. When, however, the hand lever 19 is turned slightly in a clockwise direction according to Figs. 1 and 2, or what amounts to the same thing, is given a gentle jerk or jar, so as to turn it slightly in the direction indicated, the clamping members 20, 21 slip along the edges of the bars 13 and the gate descends without shock; this especially if the operator keeps his hand upon the hand lever 19.

The operation of my device is as follows: The gate being substantially horizontal, as indicated in Fig. 1, it is free to swing. If, however, it be desired to raise the gate either for the purpose of clearing the post 6 or for any other purpose, the operator merely grasps the outer or free end of the gate (right of Figs. 1 and 2) and raises this end upwardly as indicated in Fig. 2. The gate may now be turned upon its hinges. Whenever it is desired to lower the gate, either to a horizontal level or to the ground, the operator simply manipulates the hand lever 19 and in this manner allows the outer or free end of the gate to descend as much as is desired.

There is a peculiar advantage in using single pins 12 for the purpose above indicated. That is to say, the two horizontal bars 13, 13ª at the top and bottom of the gate are so mounted upon the two pins 12 as to be free to swing when actuated by hand and this arrangement not only allows the requisite distortion of the gate, as indicated in Fig. 2, but also maintains the hinges 9, 10 in their strictly horizontal positions and in fixed relation to the cleats 11. The hinges are thus always maintained horizontal although the horizontal gate bars are free to swing in a vertical plane.

While for convenience I show a gate made practically out of wood, I do not limit myself to this precise construction, as obviously the same principles may be applied to gates made of metal, gas pipe, and various other materials. Neither do I limit myself to the particular construction shown, as reasonable changes may be made therein without departing from the spirit of my invention.

Having thus described my invention, I claim as new and desire to secure by Letters Patent:

In a gate, the combination of a cleat, bars pivotally connected therewith, connections between said bars for the purpose of maintaining them in a predetermined working relation, an additional bar pivotally connected with said cleat and adapted to swing relatively to other parts of the gate, a hand lever pivotally connected with said last-mentioned bar and movable in one direction by the end thrust of said last-mentioned bar, and clamping members pivotally mounted upon said hand lever and disposed upon opposite sides of one of said first-mentioned bars for the purpose of gripping the latter so as to support the weight of the gate whenever said hand lever is thus actuated.

In testimony whereof I have signed my name to this specification in the presence of two subscribing witnesses.

EUGENE STEBBINGS.

Witnesses:
 J. G. SANDISON,
 J. N. MENEFEE.